(No Model.)
J. W. CARNS & E. FAILOR.
BICYCLE TIRE.
No. 569,172.    Patented Oct. 13, 1896.
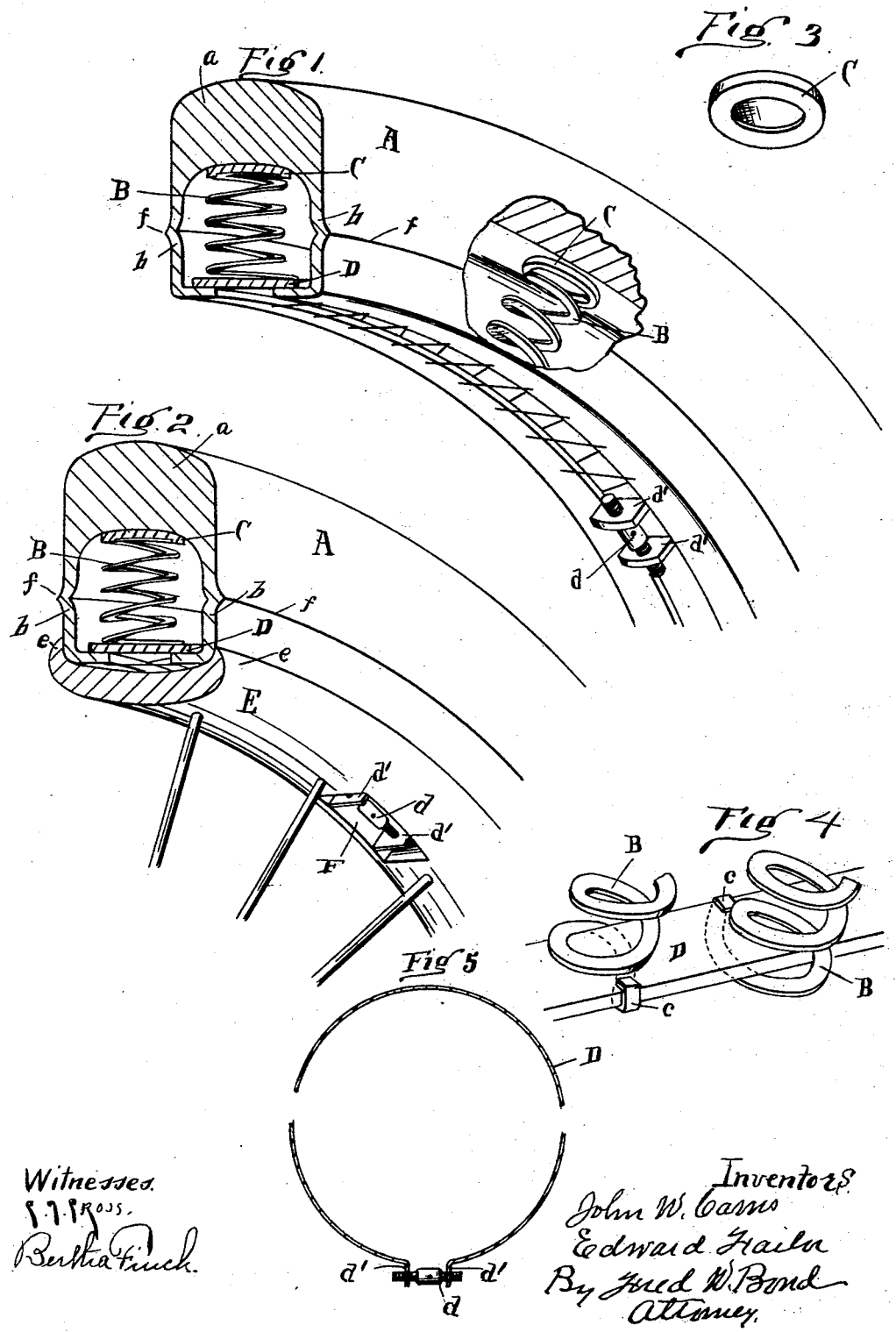
Witnesses
S. T. Ross.
Bertha Finch.
Inventors
John W. Carns
Edward Failor
By Fred W. Bond
Attorney.

UNITED STATES PATENT OFFICE.

JOHN W. CARNS AND EDWARD FAILOR, OF PIERCE, OHIO.

BICYCLE-TIRE.

SPECIFICATION forming part of Letters Patent No. 569,172, dated October 13, 1896.

Application filed December 30, 1895. Serial No. 573,691. (No model.)

*To all whom it may concern:*

Be it known that we, JOHN W. CARNS and EDWARD FAILOR, citizens of the United States, residing at Pierce, in the county of Stark and State of Ohio, have invented certain new and useful Improvements in Bicycle-Tires; and we do hereby declare that the following is a full, clear, and exact description of the same, reference being had to the annexed drawings, making a part of this specification, and to the letters of reference marked thereon, in which—

Figure 1 is a view showing the different parts of the tire properly connected, also showing a transverse section of the tire. Fig. 2 is a view showing the tire properly located upon the felly, also showing a transverse section of the tire. Fig. 3 is a detached view of one of the disks to be attached to the outer end of the spring. Fig. 4 is a view showing a portion of the tire-retaining band, also showing two of the springs located thereon. Fig. 5 is a detached view of the retaining-band.

The present invention has relation to bicycle-tires; and it consists in the different parts and combination of parts hereinafter described, and particularly pointed out in the claims.

Similar letters of reference indicate corresponding parts in all the figures of the drawings.

In the accompanying drawings, A represents the tire proper, and is preferably formed of rubber or like material and is provided with the outer solid portion $a$, from which outer solid portion extend the sides $b$, which sides are formed thin enough to be easily bent to partially close the inner portion of the tire, which side portions are stitched together, substantially as illustrated in Fig. 1.

The tire-springs B are substantially of the form shown and are located at intervals around in the tire proper.

It will be understood that a sufficient number of springs, such as B, should be employed to give to the tire proper the desired amount of rigidity, and at the same time provide a tire that will have the desired amount of elasticity.

For the purpose of providing a means for protecting the tire A from injury by reason of the springs B coming in contact with said tire, the outer ends of the springs are provided with the plates C, which plates are attached to the outer ends of the springs in any convenient and well-known manner.

The springs B are preferably formed of flat bars, said bars being bent to form the convolutions of the springs, substantially as illustrated in the drawings, the number of convolutions corresponding with the length of the springs designed to be constructed. The inner ends of the springs B are provided with the hooks $c$, which hooks are for the purpose hereinafter described.

The retaining-band D is formed of such a diameter that it will correspond substantially with the diameter of the felly upon which it is to be placed. For the purpose of tightening the retaining-band after it has been placed upon the felly the right and left hand screw-threaded bar $d$ is provided, which screw-threaded bar is passed through the angled portions $d'$ of the retaining-band D. For the purpose of providing means for rotating the screw-threaded bar $d$ the felly E is provided with the opening F, which opening may be properly covered with a plate after the retaining-band D has been properly tightened. Before the retaining-band D is placed upon the felly the springs B are attached to said band, substantially as illustrated in Fig. 4, and, as illustrated in said figure, the band is placed over the lower convolution of the spring and the hooks $c$ so adjusted that they will embrace the edges of the retaining-band.

In use all of the springs are attached to the band D, after which the tire A is placed over the springs and the sides of the tire brought under the retaining-band and stitched together. It will be understood that the springs B can be slipped into position upon the retaining-band laterally, thereby bringing the hooks $c$ into proper position to engage the band and hold the springs.

It will be understood that the plates C are to be properly attached to the springs before the tire is placed in position with reference to the spring. After the tire A has been properly connected it is placed, together with its different parts, upon the felly of the wheel, and the screw-threaded bar $d$ turned in the direction that it will tighten the retaining-band upon the felly, thereby securely holding the tire in proper position. It will also be understood that the felly E should be provided with the flanges $e$, which flanges are for the purpose of preventing any lateral displacement of the tire proper.

For the purpose of preventing the tire from cracking when it is compressed the side members $b$ are each provided with the creases $f$, which creases are so arranged that the tire will collapse at the creases without danger of breaking or cracking the material composing the tire A and its side members $b$.

Having fully described our invention, what we claim as new, and desire to secure by Letters Patent, is—

1. The combination of the tire A provided with the side members $b$, having the creases $f$, the springs B provided with the hooks $c$, the retaining-band D located above the lower convolutions of the springs, and seated in hooks $c$, and means for clamping the band D upon the felly substantially as and for the purpose set forth.

2. The combination of the tire A provided with the side members $b$, stitched together the springs B, provided upon their outer ends with the plates C, the retaining-band D located over the lower convolutions of the springs, and the right and left screw-threaded bar $d$, substantially as and for the purpose specified.

In testimony that we claim the above we have hereunto set our hands in the presence of two witnesses.

JOHN W. CARNS.
EDWARD FAILOR.

Witnesses:
JOHN F. MILLER,
SIMON RICE.